US006581704B2

(12) United States Patent
Law et al.

(10) Patent No.: US 6,581,704 B2
(45) Date of Patent: Jun. 24, 2003

(54) STEERING CONTROLS

(75) Inventors: Charles Thomas Law, Lenoir City, TN (US); William Andrew Clevenger, Knoxville, TN (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 09/886,684

(22) Filed: Jun. 21, 2001

(65) Prior Publication Data

US 2002/0195284 A1 Dec. 26, 2002

(51) Int. Cl.[7] .................................................. G05G 1/04
(52) U.S. Cl. ..................... 180/6.32; 180/6.2; 74/473.28
(58) Field of Search ............................... 180/6.66, 6.32, 180/6.2; 74/473.28, 473.21, 473.3

(56) References Cited

U.S. PATENT DOCUMENTS

| | | | |
|---|---|---|---|
| 3,605,519 A | | 9/1971 | Heggen |
| 3,850,258 A | | 11/1974 | Bauer |
| 3,995,426 A | | 12/1976 | Habinger ..................... 60/486 |
| 4,031,975 A | | 6/1977 | Engel ......................... 180/6.48 |
| 4,090,411 A | | 5/1978 | Albright et al. |
| 4,566,272 A | | 1/1986 | Petersen et al. ............... 60/384 |
| 4,621,495 A | | 11/1986 | Hedlund ...................... 60/447 |
| 5,050,700 A | * | 9/1991 | Kim ........................... 180/268 |
| 5,072,586 A | | 12/1991 | Fassbender .................. 60/384 |
| 5,232,057 A | * | 8/1993 | Renard ........................ 172/812 |
| 5,240,366 A | | 8/1993 | Bamford ..................... 414/686 |
| 5,360,312 A | * | 11/1994 | Mozingo ..................... 414/685 |
| 5,496,226 A | * | 3/1996 | Splittstoesser et al. ........ 476/24 |
| 5,553,992 A | * | 9/1996 | Ashcroft ..................... 414/685 |
| 5,894,899 A | | 4/1999 | Ashcroft et al. ........... 180/6.48 |
| 5,896,890 A | | 4/1999 | Bourkel et al. ......... 137/625.63 |
| 5,918,694 A | | 7/1999 | Miller et al. .............. 180/89.14 |
| 5,992,260 A | | 11/1999 | Fujiki et al. .................. 74/469 |
| 6,065,365 A | | 5/2000 | Ostler et al. .................. 74/528 |
| 6,390,225 B2 | * | 5/2002 | Velke et al. ................. 180/333 |

OTHER PUBLICATIONS

John Deere Parts Catalog—PC 2690, "Steering Linkage", pp. 60–13A, 60–13B, date of publication May 2000, published in U.S.A.
John Deere Parts Catalog—PC 2691, "Centering Assembly", pp. 60–10, 60–11, date of publication Sep. published in U.S.A.
Japanese Patent Abstract, Publication Number 05229451 A, Date of Publication Sep. 7, 1993, 1 page.

* cited by examiner

Primary Examiner—Lesley D. Morris
Assistant Examiner—Tony Winner

(57) ABSTRACT

A mechanism for adjusting or setting the effort required to move the steering levers of a vehicle is provided. The mechanism consists of a central mounting plate with which three separate bolt and spring arrangements are connected to control the resistance at the levers when they are moved between their forward and reverse positions. The mechanism is separately connected with structure on a steering shaft to allow resistance at each of the levers to be adjusted without substantially affecting operation of the pumps. Consequently, the vehicle may be more effectively steered as a result not interfering with its tracking or bringing about creep thereof.

14 Claims, 11 Drawing Sheets

STEERING CONTROLS

FIELD OF THE INVENTION

This invention relates to structure for controlling the amount of effort required to actuate the steering levers of an earth moving vehicle, and more specifically, to a mechanism that increases or decreases the forces placed on the levers to allow an operator to more accurately steer the vehicle.

BACKGROUND OF THE INVENTION

Movement of vehicles of the type including skid-steer loaders is typically controlled by an operator's actuation of a pair of handles or levers located near the operator's seat in the vehicle. Each of the levers operating together control either forward or rearward motion of the vehicle, i.e., to move in a forward direction, an operator needs to push both levers forward at the same time and vice versa with regard to movement in the reverse direction. If an operator is moving in a forward or reverse direction and unexpectedly releases one of the levers, it may quickly return to its neutral and upright position without permitting an opportunity for the operator to regain its control. As a consequence, the vehicle will cease to move in the desired direction and often be abruptly jerked toward either a left hand turn if the left lever is released or a right hand turn if the right lever is released.

The above movement caused by actuation of either or both of these levers is permitted through their connection with a pair of rotating sleeves which are mounted to and which revolve around a steering shaft that extends therebetween. Connected with the sleeves are separate steering linkages which attach the sleeves to both a left and right pump for controlling movement of the vehicle towards either a left or right direction. The pumps are actuated by movement of the levers to release fluid to hydraulic motors which are driven or powered by the pumps. Each of these motors then drives a plurality of wheels or other traction device attached with the vehicle to propel it along the ground surface. Accordingly, upon movement of either one or both of the levers, the operator may cause the vehicle to travel in a desired direction as some effort or force is applied by the operator to reposition one or both of the levers either away from or towards the neutral position. In doing so, however, the operator will encounter a certain amount of resistance in moving the levers from the neutral position.

Resistance is a measure of the force applied to the levers when opposition to movement thereof is encountered. It is also that which determines the pace at which each lever returns to its neutral position after it has been moved therefrom. Resistance has been controlled by a separate mechanism mounted to and cooperating with the left pump and another with the right pump. Each mechanism has included a mounting plate attached to the left and right pump individually. This mounting plate has included a top and bottom portion with the bottom portion being mounted to the pump. On an interior of the top portion, a slide plate, the purpose of which is described below, has been secured thereto. With the top portion and slide plate secured together, the set has been thereafter mated with the bottom portion for movement on guide rails or pins that extend between the two portions so as to allow the set to glide therealong. Extending through a first side of the mounting plate, a bolt around which a spring has been placed has been used to provide resistance at each of the levers. To apply a desired amount of pre-load, and thus resistance at each of the levers, screws have been secured to the slide plate on a side thereof to allow an operator to set the amount of distance that exists between the slide plate/top portion of the mounting plate combination and the back portion of the mounting plate when each lever is in the neutral position. Setting of this distance has been made by the operator securing the slide plate relative to the first side of the mounting plate through the use of the screws so as to adjust the amount of pre-load described above.

To stroke the pumps and therefore allow hydraulic fluid to flow to each motor, each of the steering linkages has been connected to an arm extending from the left or right pump that has been used to permit the pumps to be stroked upon movement of the levers. Specifically, each arm has included a roller assembly on an end thereof that is positioned to initially contact the slide plate under the pre-load set above when a particular lever is in the neutral position and which further pushes against the slide plate when the arm is re-positioned by movement of the lever to either the forward or reverse direction. Further compression of the spring then takes place as the roller contacts its slide plate. This compression of the spring thereby increases the resistance at the effected lever(s). As a consequence of applying additional pressure against the slide plate in either the forward or reverse direction, movement of the arm strokes the pump and causes hydraulic fluid to flow to the respective left or right motor to allow the traction device of the vehicle to propel it in the desired direction.

Use of the above adjustment mechanism, however, carries with it at least five disadvantages. First, achieving the same resistance at each of the levers at the same time is problematic since there are two separate mechanisms used to obtain resistance at each of the left and right levers. Such a problem arises because each mechanism uses its own spring having a separate manufacturer's preset constant determinative of the force required to place the spring in either tension or compression. Because of this, an operator is left to judge and compensate for how much force should be used to actuate one or both of the levers. To have to do so is inconvenient and bothersome to those wanting a similar amount of effort or force to be required to move each lever out of its neutral position.

Second, since two mechanisms have been used to individually provide resistance at the levers, an operator may experience a higher degree of resistance when actuating one lever than when actuating the other. With different resistance at each lever, one lever often returns to the neutral position more quickly than would be expected if both levers were set at the same level of resistance. In this case, it is often more difficult for a lever that has been released from a forward or rearward position to gradually return to its neutral position so as to allow the operator an ability to obtain control thereof. Consequently, the vehicle is often caused to be jerked from its travel direction when one of the levers is unexpectedly released, as previously mentioned.

Third, it has been difficult to adjust the resistance of both levers simultaneously and not affect the vehicle's ability to maintain proper tracking. Tracking can be described as the ability of the vehicle to maintain a straight course when each lever is positioned in its furthest forward position so as to move the vehicle forwardly. Tracking has been set by adjusting the furthest distance the lever is permitted to move forwardly and rearwardly of its neutral position. Adjustment of the resistance has been made by either loosening or tightening the screws mentioned above to vary the distance that exists between the slide plates and the bottom portion of the mounting plates. Obtaining the same resistance setting at each of the levers has further been made difficult since maneuvering of the slide plates relative to the mounting plates has affected positioning of the pump arms. This affect occurs since each respective pump arm and its roller assembly is positioned between each slide plate and mounting plate and is therefore moved itself when an adjustment to the resistance at each of the levers is made. Consequently, adjustment of the resistance at each of the vehicle's levers has been difficult to do without affecting its tracking. This difficulty exists since the mechanism(s) used to adjust the resistance is/are connected with the steering linkage(s) connecting each of levers to the respective pump arm(s).

Closely associated with the aspect of obtaining proper tracking is a fourth disadvantage regarding creep of the vehicle. Creep can be described as the tendency of the vehicle to move out of its neutral position. Setting of the neutral position has previously been done by adjusting the screws used to pre-load the spring mentioned above. These screws have been adjusted to obtain the neutral position for each of the pumps so as to bring the wheels of the vehicle to a stopped position.

Mechanisms such as those discussed thus far that adjust the resistance at each of the levers through setting of the amount of force placed on the pump arms often tend to cause the vehicle to creep. Creep of the vehicle has existed with these mechanisms because the slide plates and the pump arms contact each other when the levers are moved. To adjust the resistance at the levers, one has needed to affect positioning of the pump arms through the procedure described above. Disruption in this positioning has offset alignment in the neutral position previously obtained so as to cause the vehicle to not be able to obtain that position. As a result, the vehicle may move in an uneven or staggered pattern when moving from or returning to its neutral position.

Fifth, because there are two adjustment mechanisms, the cost of obtaining that same level of resistance when moving in the forward or rearward direction is expensive since separate components must be manufactured, installed and thereafter maintained.

Thus, it would be beneficial to provide an apparatus that permits an operator to simultaneously adjust the resistance experienced at each of the levers with minimal effort. Additionally, it would be beneficial to provide a single apparatus that permits the operator to obtain the same amount of resistance at each of the levers so as to steer the vehicle more effectively and do so with minimized cost.

SUMMARY OF THE INVENTION

Accordingly, there is provided a mechanism enabling an operator to easily adjust the resistance at the left and right levers at the same time. Also, there is provided a mechanism that allows the levers to gradually obtain a common neutral position allowing the operator to effectively steer the vehicle when starting from and returning to that position. Further, the mechanism is constructed with fewer components than structure previously used to set the resistance at both levers to thereby permit reduced costs of manufacture, installation and repair if needed.

To permit the vehicle to move, each of the levers is connected to a revolving sleeve mounted with the steering shaft that extends between the levers. Connected with the sleeves are two steering linkages, one for the left lever and one for the right lever, each having its opposite end connected to an arm extending from a respective left or right pump. Accordingly, upon movement of the levers, the sleeves are rotated to allow the arms to be moved so as to stroke or activate the pumps which then allows fluid to be released to the motors to cause the vehicle to move.

Control of the resistance at each of the levers is obtained by connecting the sleeves, and thus each lever, with a separate single adjustment mechanism. Specifically, the mechanism includes a left and right adjustment means in the form of an elongated bolt that connects the steering sleeves to a mounting plate coupled with the pumps. The mounting plate includes a bottom surface as well as front and rear walls. Each of the bolts is unsecured to the mounting plate and extends through a front wall thereof. The bolts continue and extend through a floating slide plate and include head portions which may abut against the slide plate depending on the position of each of the levers. Each of the bolts further includes a spring that is wrapped around a portion of the bolt which extends prior to the front wall of the mounting plate. Placement of the springs at that location permits them to be compressed against the front wall of the mounting plate when either the left or right lever or both is moved rearwardly. Setting of the amount of resistance experienced at either of the levers is accomplished through simply adjusting a nut coupled to either bolt and which holds the spring between the nut and front wall of the mounting plate. Accordingly, the resistance at each of the levers may be quickly adjusted since an operator need only access the nut and dial it along the bolt to obtain the amount of spring compression, and therefore the resistance that is desired for each of the levers.

When moved forwardly, resistance at each lever results from a center adjustment bolt positioned between the left and right adjustment bolts and which is secured to both the front and rear wall of the mounting plate. This center rod carries a spring thereon such that when the left and right levers are moved forwardly, the floating slide plate compresses against it as the heads on the ends of the left and right adjustment bolts opposite those connected to the steering sleeves will drag the slide plate toward the front of the vehicle. In doing so, the operator can obtain the same level of resistance when moving the left and right levers forwardly since only this center spring is placed in compression when both levers are moved forwardly. Likewise as in the case of setting the resistance at each of the levers in the reverse direction, a nut is used to establish the level of spring compression when the vehicle is moved forwardly. Accordingly, an operator may easily deliver the same level of spring compression for each of the levers thereby allowing the operator to obtain a synchronized amount of resistance for each lever to allow the vehicle to be more effectively steered in the forward direction.

To permit an operator to not affect the vehicle's ability to track properly and also not cause it to creep, there is provided a mechanism that adjusts the resistance for each of the levers without being directly connected to the pump arms. This lack of structural connection between the adjustment mechanism and the pump arms permits resistance at each of the levers to be adjusted without affecting operation of the pumps, as described above. Accordingly, the vehicle may be steered more effectively since the pumps and structure associated therewith are operated independently of the resistance setting for each lever.

Additionally, since the resistance at both levers is separately controlled by the center rod and its associated spring when moved in the forward direction, the pace at which either lever returns to its neutral position is also separately controlled. Control of such pace is especially true when one lever is released and the other is maintained in the forward direction. In such a situation, the center spring will remain compressed against the slide plate as at least one lever is maintained in a forward stance. Thus, the spring along the rod with which the released lever is associated is permitted to gradually return the lever to the neutral position without affecting operation of the pumps since it is biased independently of the connection of the steering linkages to the pump arms. Consequently, the ability of the operator to obtain control of the lever that is suddenly released is increased so as to be more able to stop the vehicle from being abruptly diverted or jerked from an intended travel direction.

Thus, there is provided an adjustment mechanism for setting the resistance at the steering levers of an earth moving vehicle whereby the mechanism allows an operator to easily adjust the resistance of each lever to the same level at the same time in order to permit easy steering and control of the vehicle. Additionally, there is provided an adjustment mechanism that permits setting of the resistance at each lever with utilization of minimal parts permitting reduced costs of construction, installation and maintenance.

DESCRIPTION OF THE PREFERRED EMBODIMENTS

Figure 1:
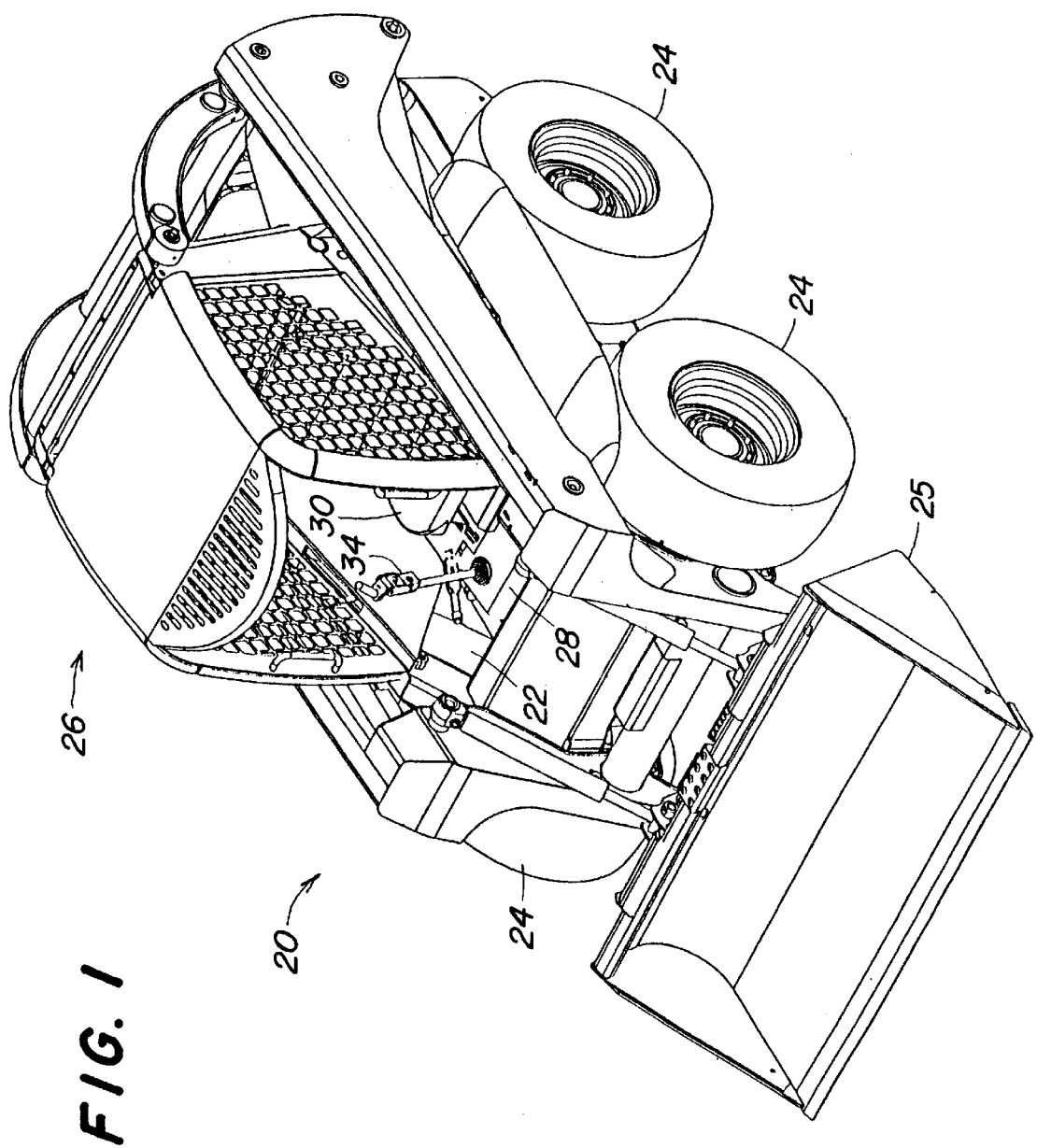
FIG. 1 is a front and side elevation view of a skid steer loader.
Figure 2:
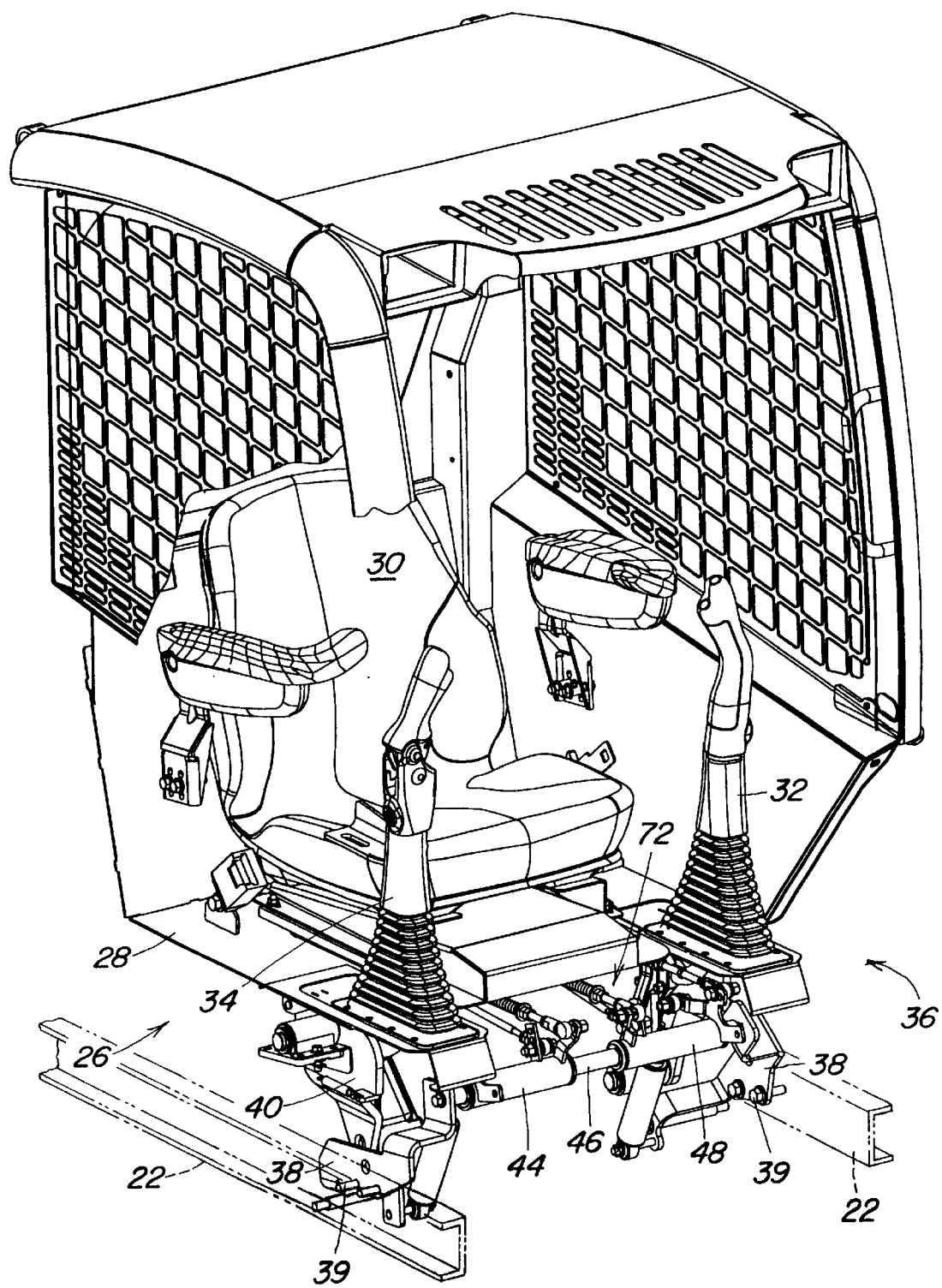
FIG. 2 is a front and side perspective view of the operator's station of the loader according to FIG. 1.

Looking to FIGS. 1 and 2, there is shown an earth moving vehicle 20, commonly referred to as a skid-steer loader, having a frame 22 supported upon ground engaging wheels 24, a bucket 25, a partially enclosed operator's platform 26 including flooring 28, and a seat 30. Located near the seat 30 are steering controls in the form of upright left and right levers 32, 34.

FIG. 2 illustrates in greater detail the operator's platform 26 shown in FIG. 1. Shown therein is the operator's seat 30 and left and right levers 32 and 34, respectively. Beneath the floor 28 is a steering control system 36 permitting the operator to choose from among a plurality of directions in which to operate the vehicle 20. As shown in FIG. 2, a pair of brackets 38 and yokes 40, one of each pair being placed on opposing sides of the frame 22, serve to allow the operator enclosure and platform 26 along with the steering system 36 to be mounted to the frame 22. To accomplish this, pins 39 are provided for securing the brackets 38 and yokes 40 with the frame 22.

Figure 3:
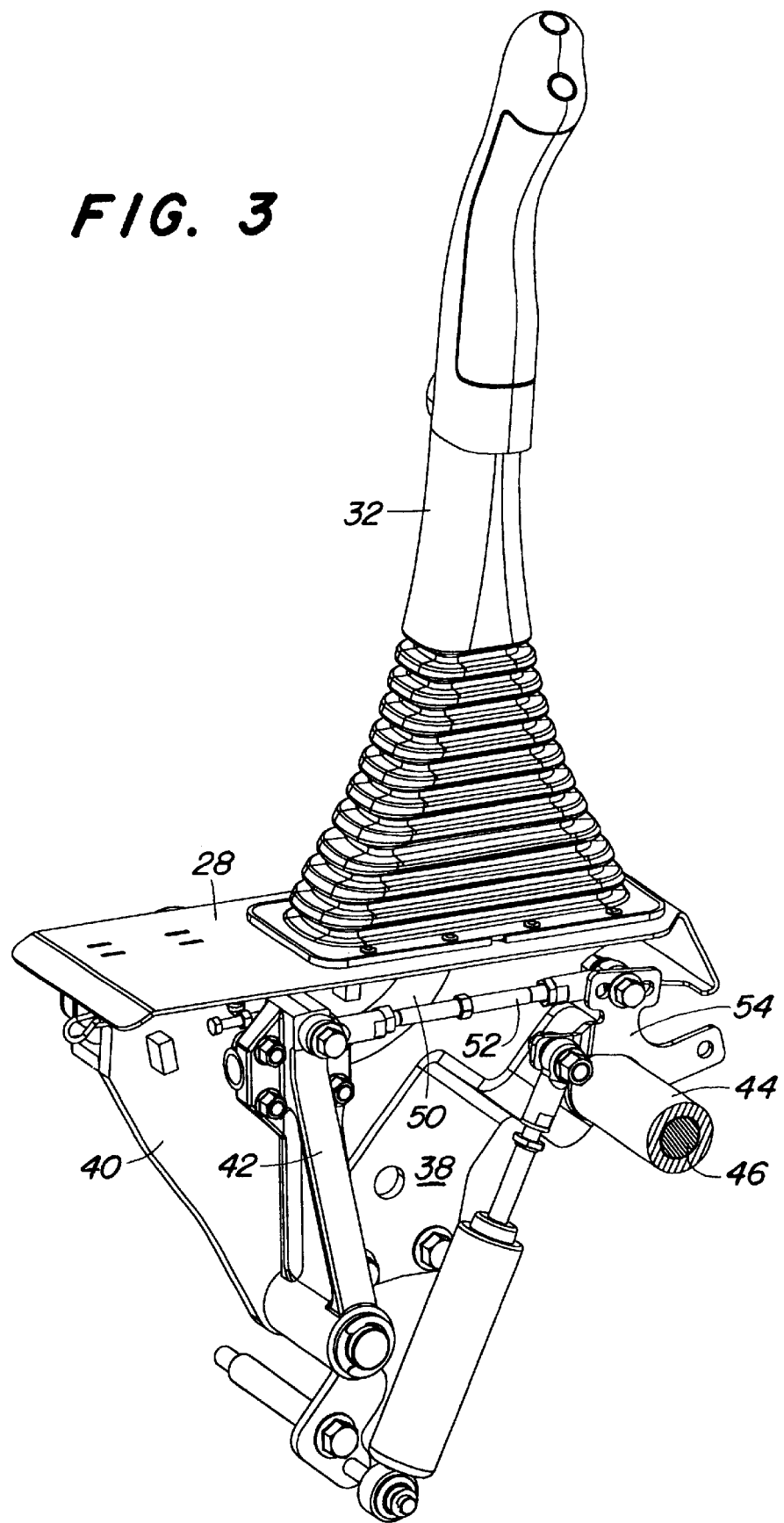
FIG. 3 is a side perspective view of an operator's control lever and its attachment with the vehicle's steering shaft.
Figure 4:
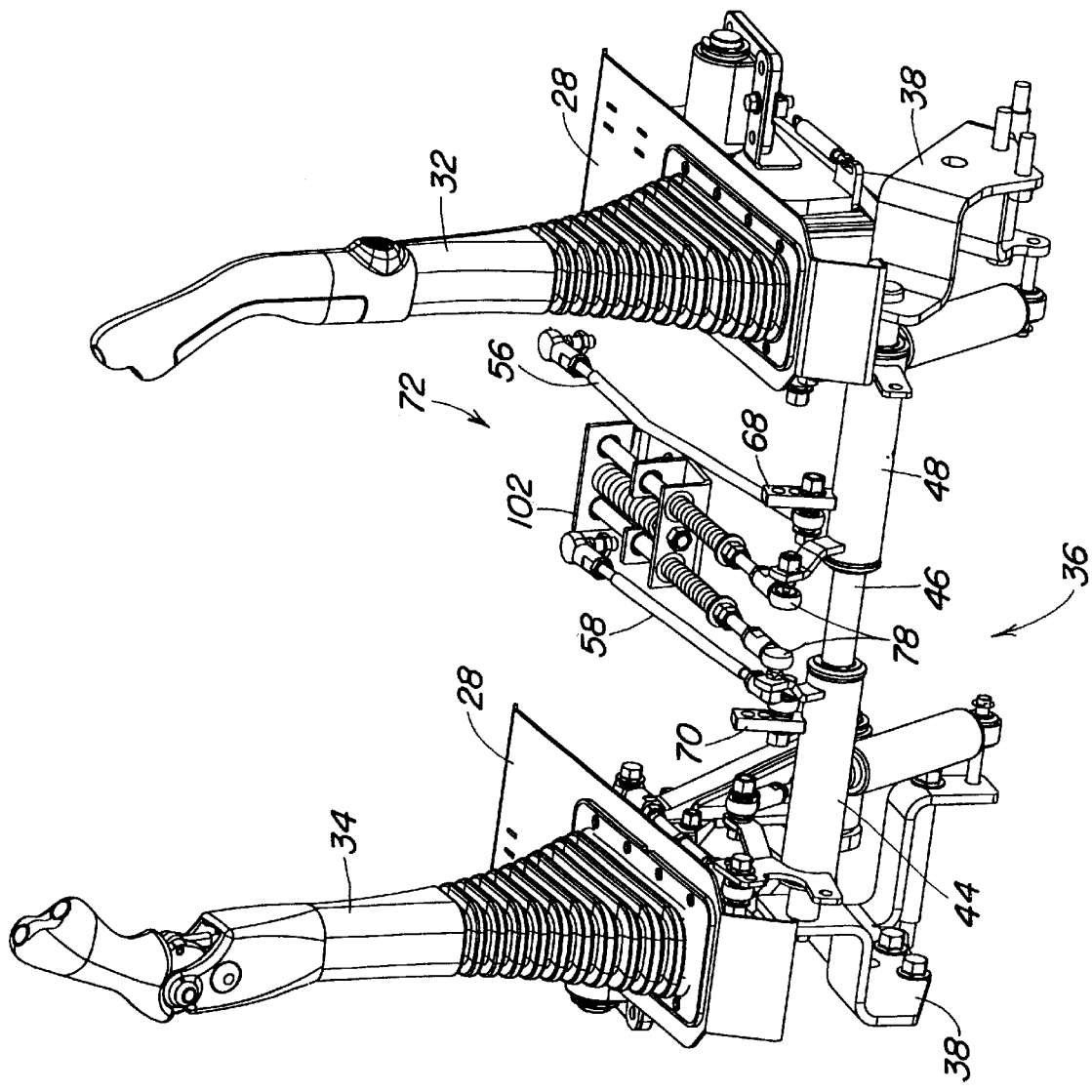
FIG. 4 is a front and side elevated perspective view of the operator's control levers and their connection with the resistance adjustment mechanism of the present invention.

FIG. 2, and more specifically FIG. 3, show the connection of the right lever 34 to a pivot arm 42. Each pivot arm 42 is swingable relative to its respective yoke 40 and is used to assist in translating movement of the lever 34 to a first sleeve 44 that surrounds a steering shaft 46 on the right side thereof. A similar construction including a second sleeve 48 is provided at the left side of the shaft 46, as is shown in FIG. 4. Connection of the lever 34 to the pivot arm 42 is accomplished by a tube 50 that extends downwardly therefrom as is seen in FIG. 3. Further assisting in translating movement of the pivot arm 42 to the steering shaft 46 is a rod 52 joining the pivot arm 42 to a bracket 54 mounted with the sleeve 44. Through their connection, movement of the lever 34 permits the sleeve 44 to be rotated toward either the forward or reverse position of the vehicle 20, depending upon the operator's selection.

Figure 5:
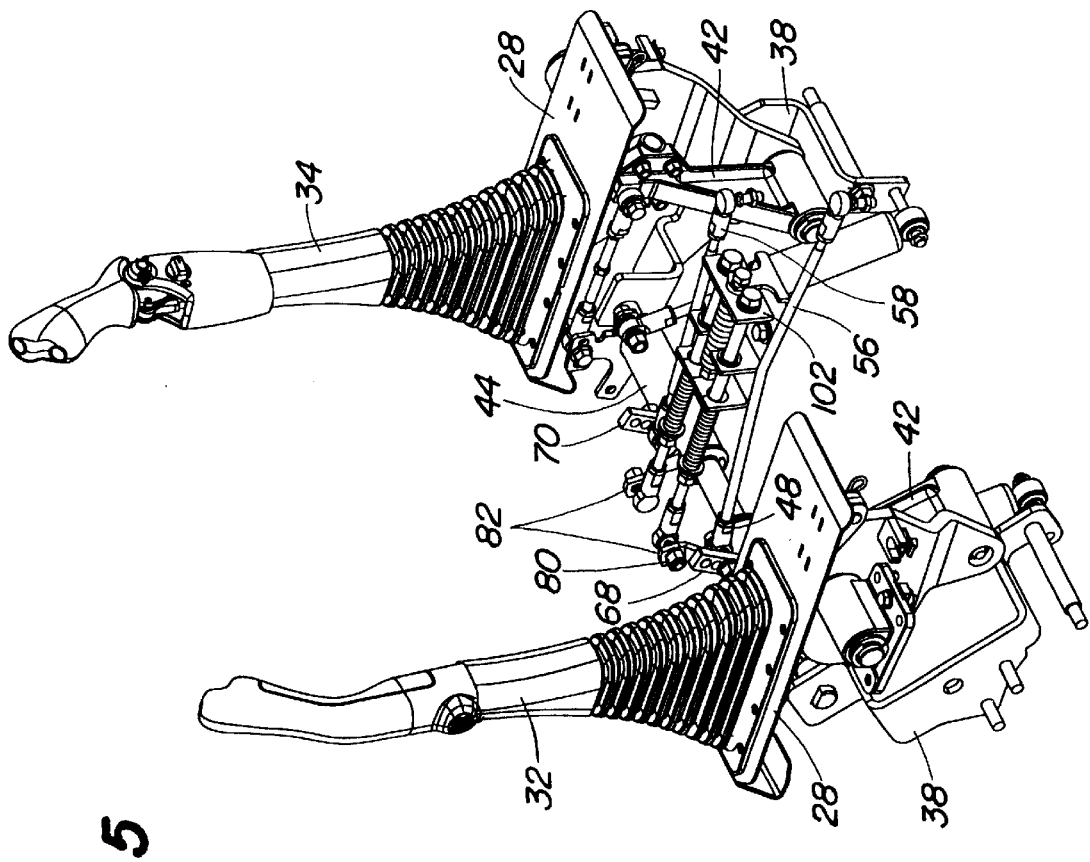
FIG. 5 is a rear and side elevated perspective view according to FIG. 4.
Figure 6:
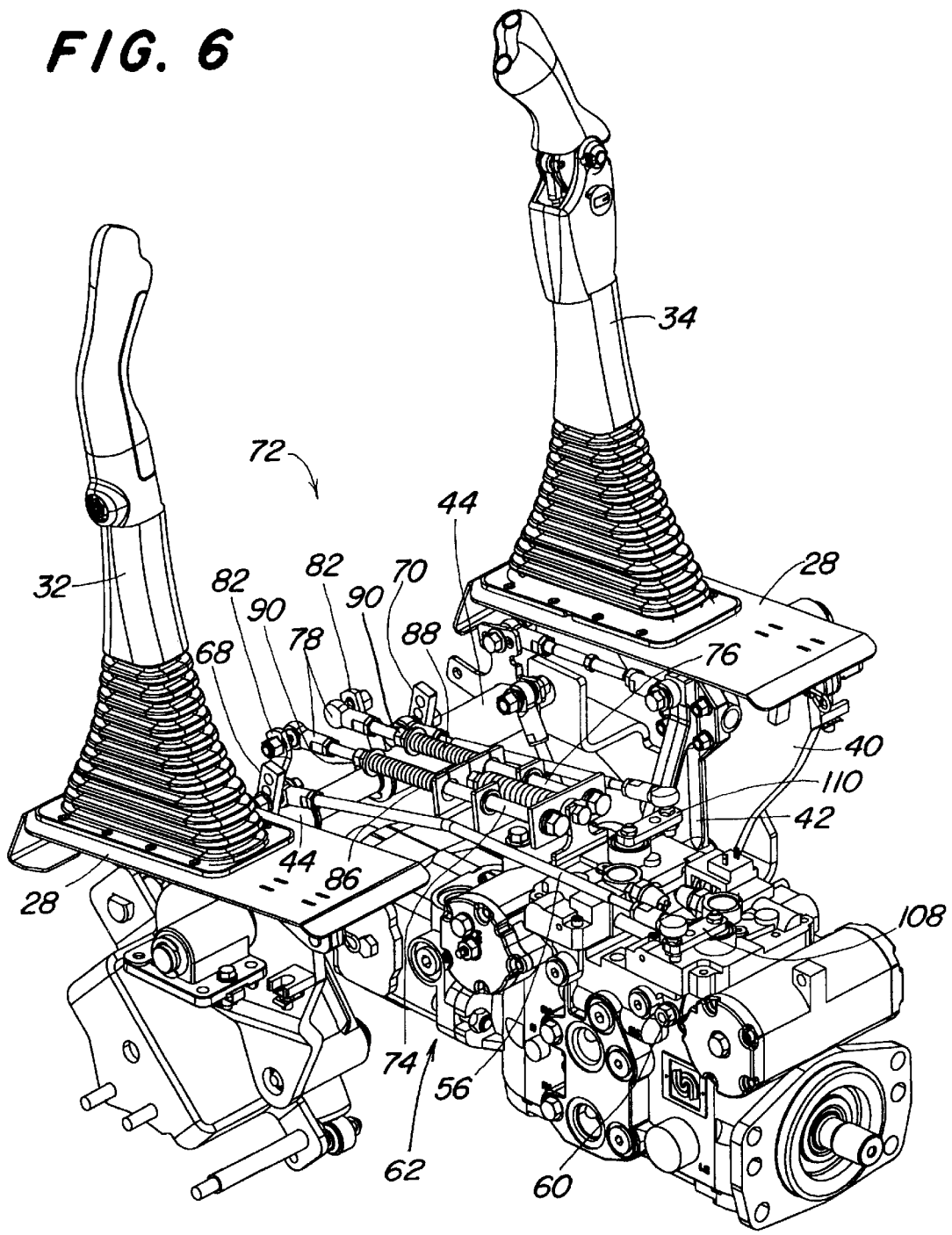
FIG. 6 is a rear and side elevated perspective view of the connection of the operator's levers to the resistance adjustment mechanism and its connection to the vehicle's hydrostatic pumps.

FIGS. 4 and 5 more closely depict the steering system 36 including its associated left and right steering linkages 56, 58 which extend rearwardly to their respective pumps 60, 62, as shown in FIG. 6. Attached to each of the left and right sides 64, 66 of the shaft at the sleeves 44, 48 is a bell crank or lever arm 68, 70 permitting the sleeves 44, 48 to be connected with the linkages 56, 58 to translate rotary motion of the sleeves 44 and 48 to linear motion, thereby allowing the linkages 56, 58 to stroke or activate the pumps 60, 62 shown in FIG. 6.

Figure 7:
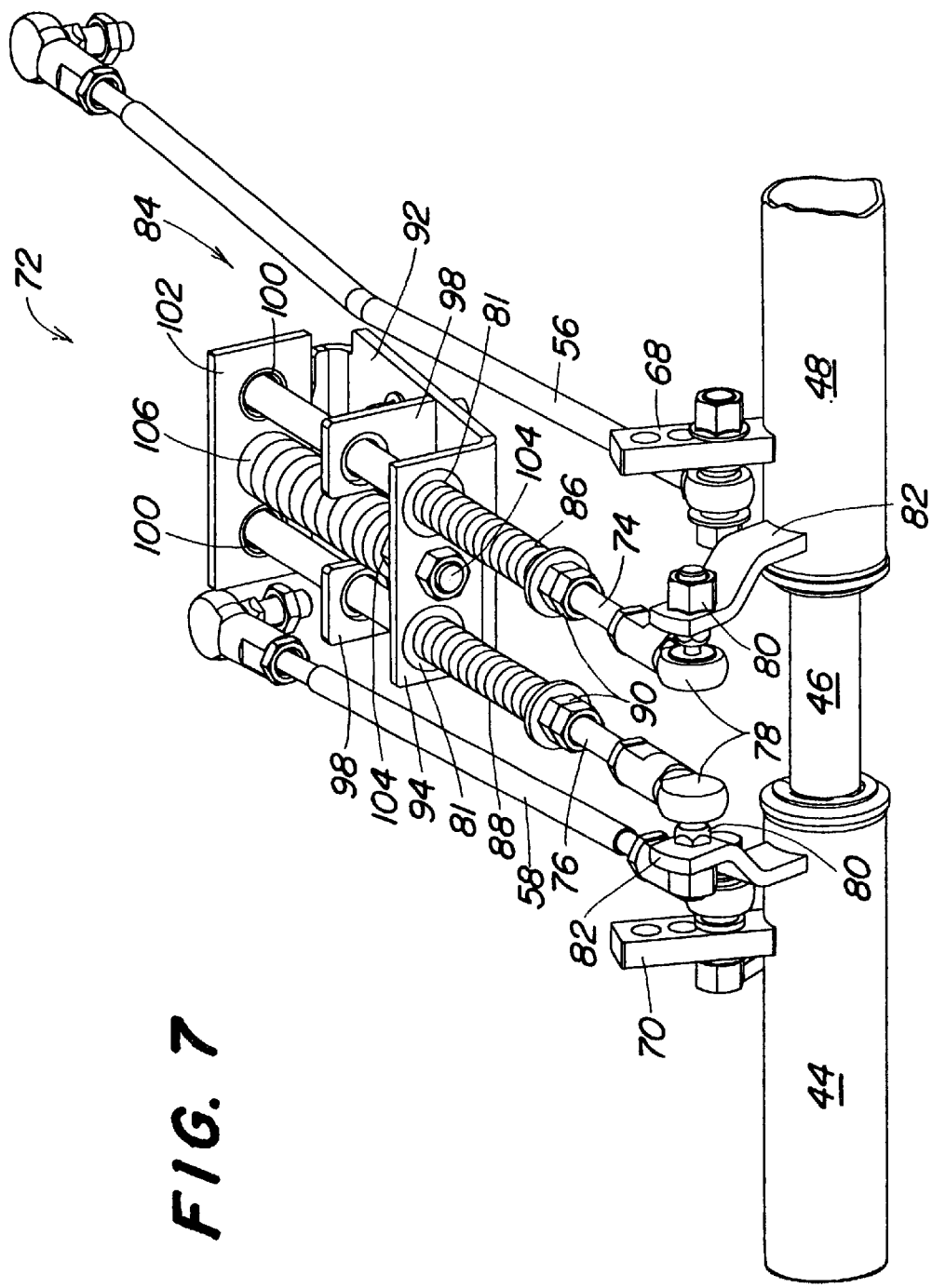
FIG. 7 is an enlarged front and side elevation view of the resistance adjustment mechanism and its connection to the vehicle's steering shaft.

Looking now to FIGS. 6 and 7, an adjustment mechanism 72 is positioned between each of the steering linkages 56, 58 to allow an operator the opportunity to set, i.e., to increase or decrease, the amount of resistance associated with actuation of the levers 32, 34 to and from their neutral or stationary position. The mechanism 72 includes two adjustment bolts 74, 76 extending rearwardly from the sleeves 44, 48, one bolt being used to cause resistance at the left lever 32 and the other bolt being used to cause resistance at the right lever 34, respectively, when the left or right lever 32 or 34 or both is actutated. Each of the bolts 74, 76 is associated with the shaft 46 by insertion of a connector 78 placed at the end thereof and which mates with apertures 80 in an upstanding bracket 82. The remainder of each bolt is then inserted through appropriately sized apertures 81 constructed in a mounting plate 84 positioned between and mounted with the two pumps 60, 62 as shown in FIG. 6. Bolts 74, 76 are further provided with a spring 86, 88, respectively, that is sized to be held on a portion thereof that extends from the shaft 46 but prior to the mounting plate 84. Each spring 86, 88 is held in abutting engagement against the mounting plate 84 at one end and against a nut 90 threadedly secured thereto at its opposite end.

Mounting plate 84, as shown in FIG. 7, includes a bottom surface 92 as well as front and rear walls 94, 96. Front wall 94 includes the apertures 81 for insertion of the bolts 74, 76 therethrough. Bolts 74, 76 are further inserted in stabilizers 98 and apertures 100 in a slide plate 102, as shown therein, whereby the stabilizers 98 are used to assist in maintaining each of the bolts 74, 76 in an upright position since they are not fastened or secured to the mounting plate 84. Slide plate 102 is utilized in creating resistance on the levers 32, 34 upon their movement from the neutral position, as further discussed below.

Referring again to FIGS. 4 and 5, mounting plate 84 includes a center adjustment rod 104 and associated spring 106 coiled around its periphery. Unlike adjustment rods 74, 76, center rod 104 is fastened, through the use of screws 106, to the front and rear walls 94, 96 of the mounting plate 84, as seen in FIGS. 4 and 5.

Positioning of the adjustment mechanism 72 and connection of each of the steering linkages 56, 58 to the left and right hydrostatic pumps 60, 62 is shown in FIG. 6. As illustrated, linkages 56, 58 extend rearwardly from their respective sleeves 44, 48 to connect with pump arms 108, 110 mounted with and extending laterally from each of the left and right pumps 60, 62. Movement of either the left or right lever 32 or 34 causes the respective portion of the sleeve 44 or 48 to revolve around the shaft 46 to thereby shift the associated linkage fore and aft relative thereto so as to swing the pump arm 108 or 110 accordingly.

Figure 8:
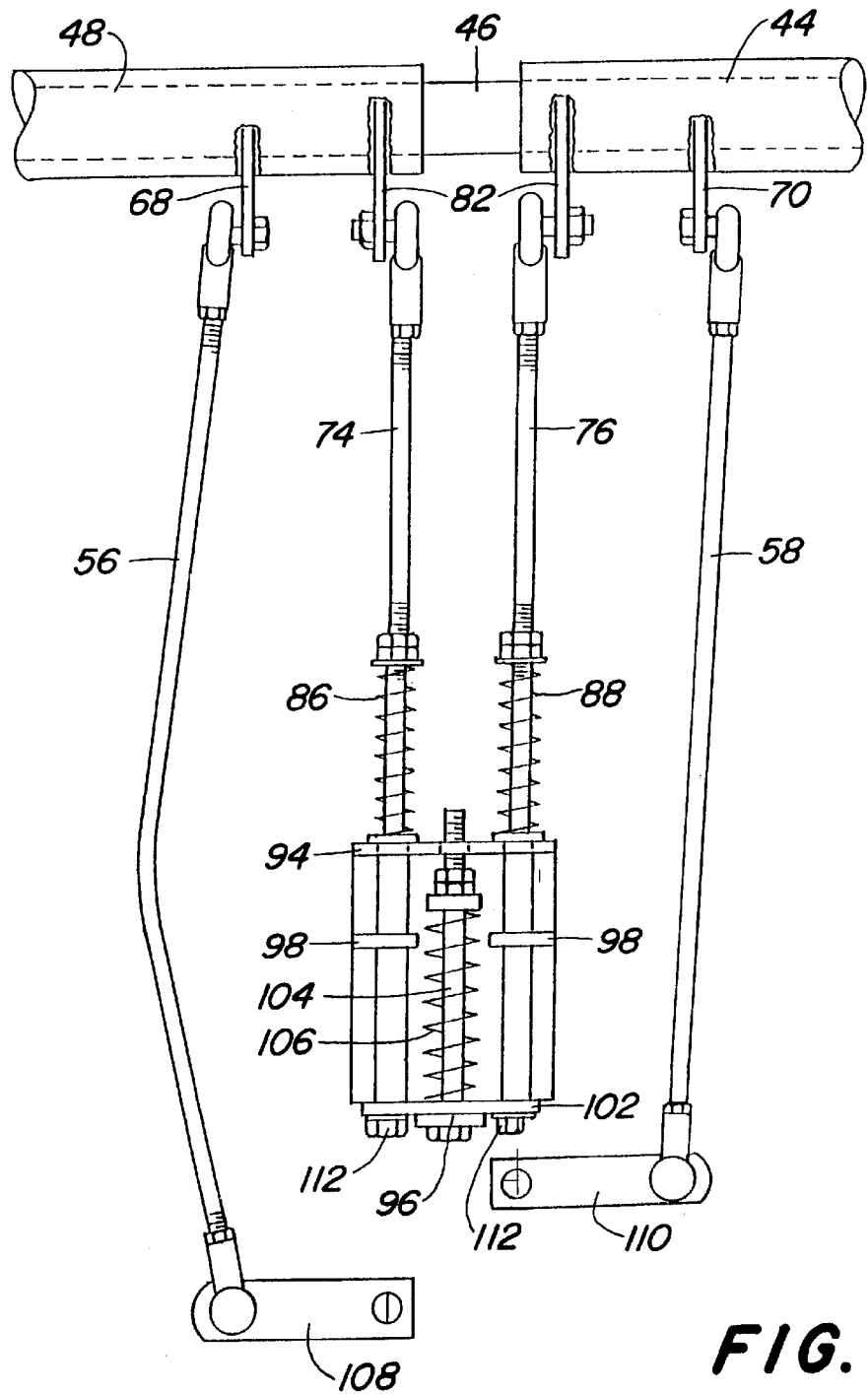
FIG. 8 is a schematic illustrating operation of the adjustment mechanism when the vehicle steering system is in a neutral position.

With FIGS. 8–11, operation of the adjustment mechanism 72 can be seen as the vehicle 20 is motioned from a neutral position to both forward and reverse positions as well through a left hand turn. Each of these positions is shown relative to the corresponding movement of the pump arms 108,110. Beginning with FIG. 8, operation of each of the adjustment bolts 74, 76 is illustrated when the vehicle 20, and more specifically, the left and right levers 32, 34 are both positioned in a neutral position. In this position, each of the levers 32, 34 is held in an upright stance as indicated by the horizontal positioning of arms 108, 110 as shown in FIG. 8. Also, since each of the springs 86, 88 is not compressed, substantially no force is applied thereon. Accordingly, each of the springs 86, 88 biases its respective lever towards the neutral position by virtue of its own stretched state. In this state, the left and right springs 86, 88 work to bias the levers 32, 34 away from placement in a reverse position while center spring 106 works to urge the levers 32, 34 away from placement in a forward position to thereby achieve the neutral position.

Figure 9:
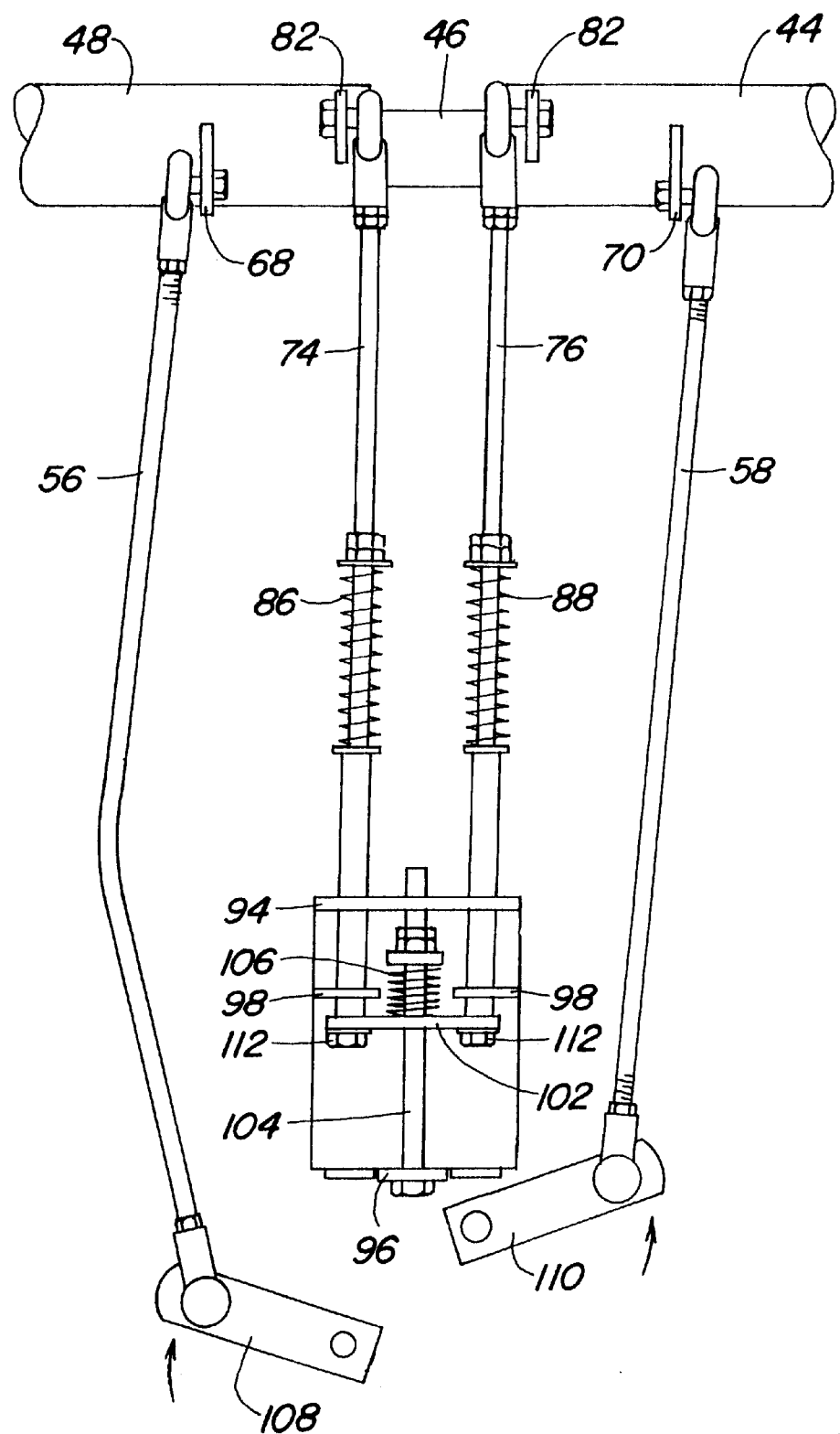
FIG. 9 is a schematic illustrating operation of the adjustment mechanism when the steering levers are positioned in a forward position.

As shown in FIG. 9, each of the levers 32, 34 is positioned in the forward position, as indicated by the arrows, so as to likewise steer the vehicle 20. When placed in the forward position, sleeves 44, 48 similarly rotate. Upon this rotation, each of the adjustment bolts 74, 76 is pulled in the same direction causing the slide plate 102 to drag against the center spring 106 since head portions 112 attached at the ends of bolts 74, 76 abut against the plate 102 and remain in contact therewith until each of the levers 32, 34 is released from its forward position. Thus, when beginning to move the vehicle 20 forward, each of the levers 32, 34 will encounter the same amount of resistance or force urging them to return to the neutral position since only spring 94 will work to urge both levers back toward the neutral position. Enabling this same amount of force at each of the levers 32, 34 further permits the operator to know how much effort is required to move either or both of the levers 32, 34 so as to cause the vehicle 20 to move forward.

Figure 10:
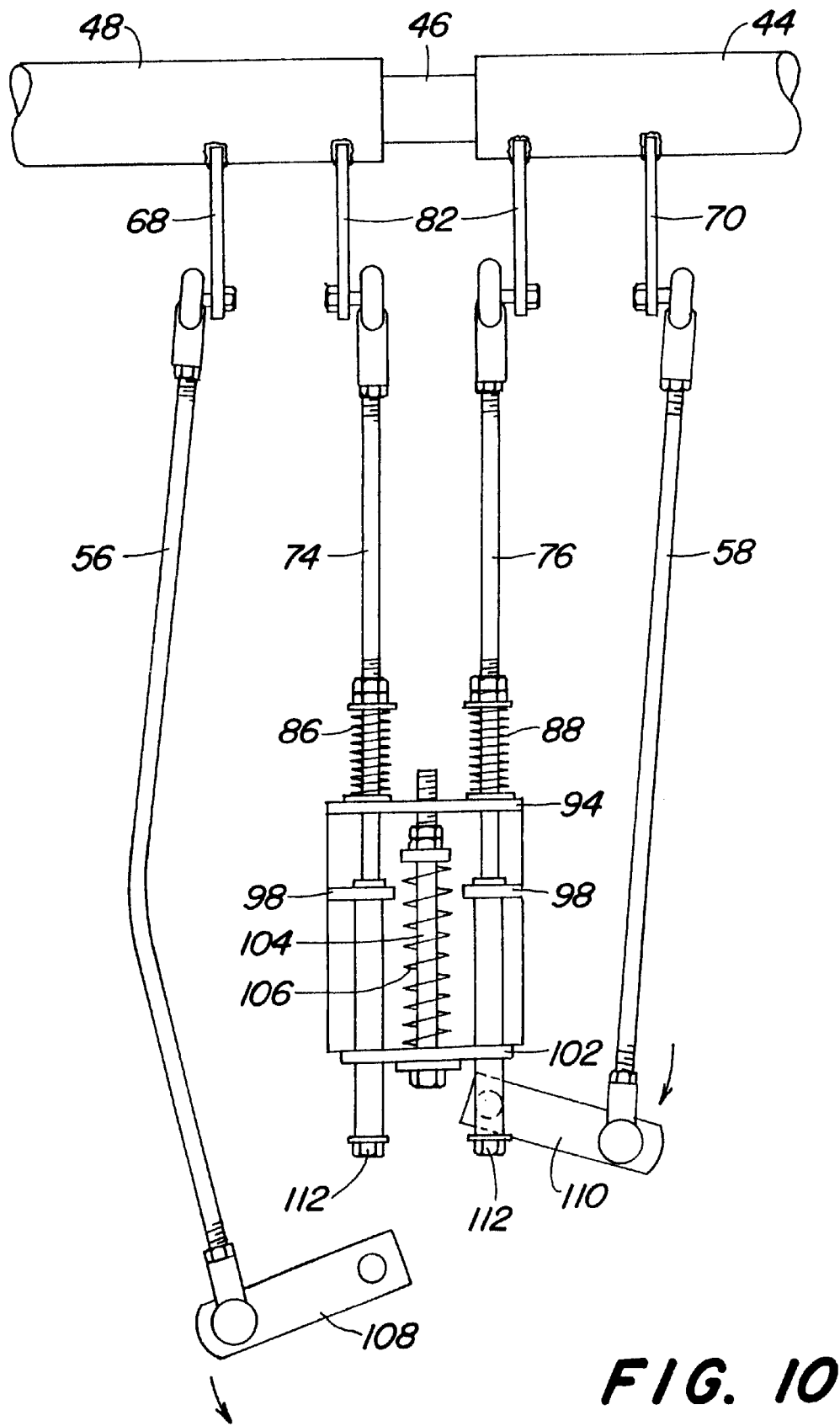
FIG. 10 is a schematic illustrating operation of the adjustment mechanism when the steering levers are positioned in a reverse position.

FIG. 10 demonstrates the opposite of that depicted in FIG. 9, i.e., movement of the levers 32, 34 rearwardly and thus the vehicle 20 towards a reverse direction as indicated by the arrows. In this direction, center spring 106 remains uncompressed as it is used only to provide resistance at the levers 32, 34 when the vehicle 20 is driven forwardly. Instead, springs 86, 88 associated with left and right adjustment bolts 74, 76 become compressed as they abut against front wall 94 of plate 84 and work to urge the levers 32, 34 back toward the neutral position. Permitting such abutment is a tapered construction, as can be seen in FIG. 5, of rear wall 96 to allow each of the bolts 74, 76 to extend past it.

Figure 11:
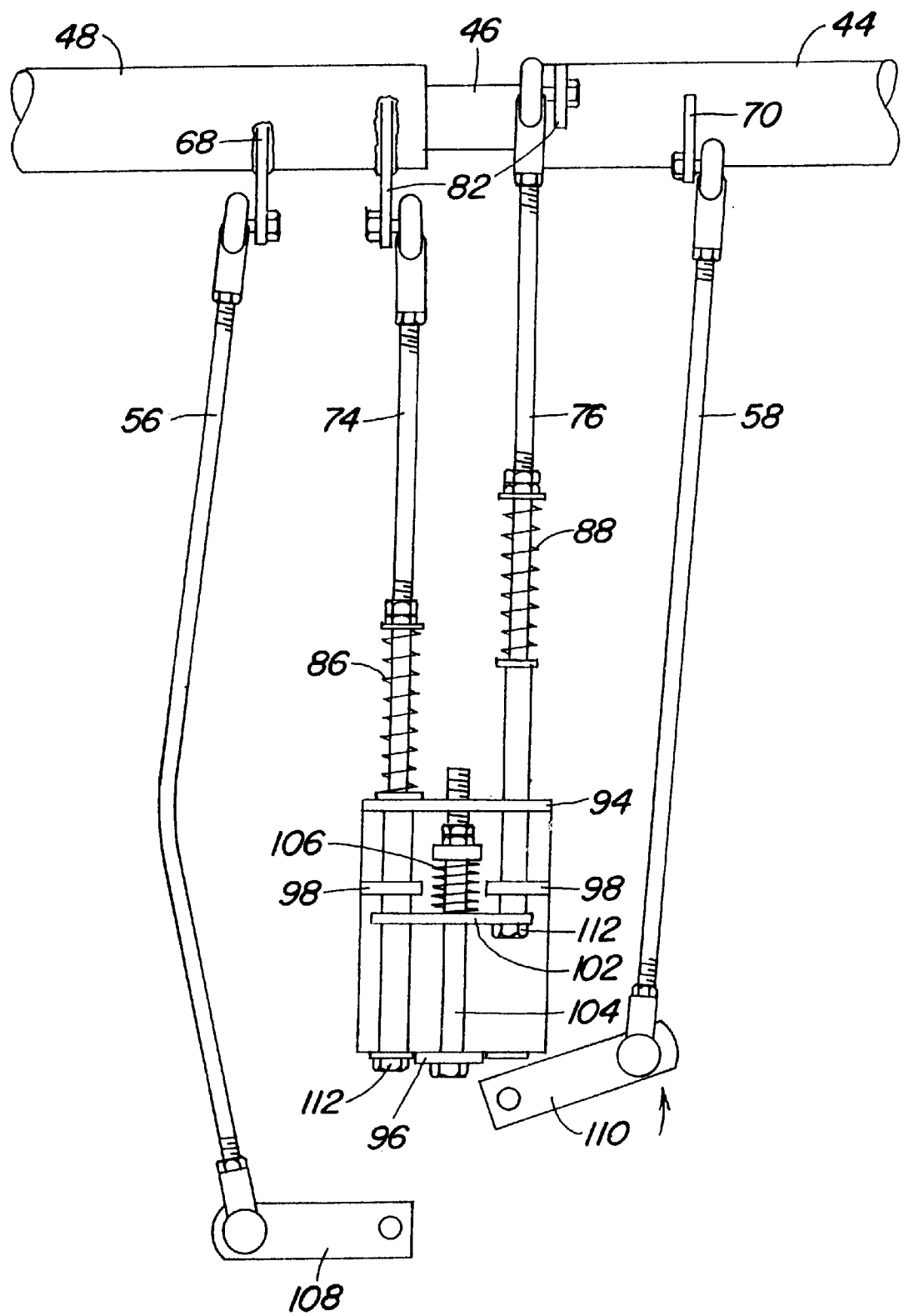
FIG. 11 is a schematic illustrating operation of the adjustment mechanism and positioning of the steering levers when the vehicle is engaged in a left turn.

Looking to FIG. 11, movement of the steering linkages 56, 58 and adjustment bolt 74, 76 is shown as the vehicle 20 engages in a left hand turn. It is understood that the configuration of the linkages when the vehicle executes a right hand turn would effectively reverse the position of the affected linkage and adjustment components. During the left turn, the right steering lever 34 is motioned forwardly as the left steering lever 32 is held in the neutral position. With this combination, center spring 106 is compressed given the contact of slide plate 102 thereagainst as described above. With regard to the springs 86, 88, right spring 88 remains stretched so as to not contribute to the resistance provided at right lever 34. Rather, the total resistance experienced at the lever 34 is directly attributable to compression of the center spring 106 as it is sandwiched between the slide plate 102 and the inside of the front wall 94 of the mounting plate 84. Left spring 86 remains in a stretched state as shown in FIG. 11 from the time left lever 32 is moved from its full forward position throughout a portion of the time it takes to return to its neutral position. When it does reach the neutral position, the left lever 32 is substantially stopped as the spring 86 will abut up against the outside of front wall 94. If it is inadvertently released or otherwise, the return of the lever 32 is buffered in the sense that spring 86 will abut against the front wall 94 of mounting plate when it is released to thereby substantially restrain movement of lever 32 beyond its neutral position. Otherwise, bolt 74 may have a tendency to move beyond the rear wall 96. Preventing such movement enables the vehicle 20 to avoid jerking or being otherwise diverted from its intended direction when a change in direction is caused or arises since the lever 32 will be able to obtain its neutral position.

Accordingly, there is provided an adjustment mechanism that permits the operator to set the resistance at each of the levers 32, 34 when moving the vehicle 20 in the forward or reverse directions without affecting normal operation of the pumps. Having such a capability when moving in the forward direction permits that setting without affecting the vehicle's tracking or contributing to the creep thereof. Further, there is provided a mechanism that addresses the aforementioned concerns with fewer parts that has been previously used to enable a reduction in costs of manufacture, installation and repair.

Having described the preferred embodiment, it will become apparent that various modifications can be made without departing from the scope of the invention as defined in the accompanying claims.

We claim:

1. An earth moving vehicle comprising:

a) a frame;

b) left and right drive wheels carried by the frame, each of the wheels being rotatable to a forward, neutral and reverse position;

c) first and second mounting brackets, each connected on opposite sides of the frame;

d) first and second yokes attached, respectively, with the first and second mounting brackets;

e) first and second pivot arms operatively attached with the first and second yokes, respectively;

f) first and second hand control levers connected with a respective one of the first and second pivot arms, each of the levers being moveable from a neutral position in which the vehicle is stationary to either a forward or reverse direction such that either or both levers can be shifted from the neutral position so as to steer the vehicle;

g) a steering shaft extending between the yokes;

h) first and second sleeves mounted with the shaft for movement around it;

i) first and second pumps carried by the frame and operatively coupled, respectively, with the left and right drive wheels to allow the wheels to rotate in their forward and reverse directions or maintain them in their neutral position;

j) first and second linkages coupling the first and second sleeves, respectively, to the first and second pumps for adjusting the pumps and driving the wheels in their forward or reverse direction; and k) an adjustment mechanism for setting the resistance of both the first and second levers, and which includes a mounting plate coupled with at least one of the first and second pumps, the mounting plate including a bottom surface and front and rear walls.

2. The vehicle as recited in claim 1 wherein:

the adjustment mechanism includes a mounting plate secured to a top surface of both the first and second pumps.

3. The vehicle as recited in claim 2 wherein:

the mounting plate includes a bottom surface and front and rear walls.

4. The vehicle as recited in claim 3 wherein:

the rear wall is tapered upwardly from the bottom surface.

5. The vehicle as recited in claim 1 wherein:

the adjustment mechanism includes left and right bolts extending from the first and second sleeves, respectively, and passing through the front wall and being extendable past the rear wall, and a slide plate moveable between the front and rear wall.

6. The vehicle as recited in claim 5 wherein:

the adjustment mechanism includes a center bolt disposed between the left and right bolts and which is secured to the mounting plate at its front and rear walls.

7. The vehicle as recited in claim 6 wherein:

each of the bolts includes a spring carried thereon as well as a nut used to compress the spring against itself and a portion of the mounting plate.

8. The vehicle as recited in claim 7 wherein:

each spring associated with the left and right bolts is located on a portion thereof which extends between the steering shaft and the front wall so as to be placed in compression against the front wall to thereby urge movement of the respective levers toward their neutral position when either or both of the first and second levers is/are moved rearwardly.

9. The vehicle as recited in claim 8 wherein:

the center spring is placed in compression against the front wall by movement of the centering plate thereagainst to urge movement of the first and second levers toward their neutral position when the levers are moved to a position forward of the neutral position.

10. An earth moving vehicle comprising:

a) a frame;

b) left and right drive wheels carried by the frame, each of the wheels being rotatable to a forward, neutral and reverse position;

c) first and second mounting brackets, each connected on opposite sides of the frame;

d) first and second yokes attached, respectively, with the first and second mounting brackets;

e) first and second pivot arms operatively attached with the first and second yokes, respectively;

f) first and second hand control levers connected with a respective one of the first and second pivot arms, each of the levers being moveable from a neutral position in which the vehicle is stationary to either a forward or reverse direction such that either or both levers can be shifted from the neutral position so as to steer the vehicle;

g) a steering shaft extending between the yokes;

h) first and second sleeves mounted with the shaft for movement around it;

i) first and second pumps carried by the frame and operatively coupled, respectively, with the left and right drive wheels to allow them to rotate in their forward and reverse directions or maintain them in their neutral position;

j) first and second linkages coupling the first and second sleeves, respectively, to the first and second pumps for adjusting the pumps and driving the wheels in their forward or reverse direction; and k) an adjustment mechanism for setting the resistance of both the first and second levers, the mechanism being free of operative connection with the pumps and including at least a plate and spring arrangement for enabling the relative adjustment of the resistance associated with each of the levers.

11. An earth moving vehicle comprising:

a) a frame;

b) left and right drive wheels carried by the frame, each of the wheels being rotatable to a forward, neutral and reverse position;

c) first and second mounting brackets, each connected on opposite sides of the frame;

d) first and second yokes attached, respectively, with the first and second mounting brackets;

e) first and second pivot arms operatively attached with the first and second yokes, respectively;

f) first and second hand control levers connected with a respective one of the first and second pivot arms, each of the levers being moveable from a neutral position in which the vehicle is stationary to either a forward or reverse direction such that either or both levers can be shifted from the neutral position so as to steer the vehicle;

g) a steering shaft extending between the yokes;

h) first and second sleeves mounted with the shaft for movement around it;

i) first and second pumps carried by the frame and operatively coupled, respectively, with the left and right drive wheels to allow the wheels to rotate in their forward and reverse directions or maintain them in their neutral position;

j) first and second linkages coupling the first and second sleeves, respectively, to the first and second pumps for adjusting the pumps and driving the wheels in their forward or reverse direction; and k) a mechanical adjustment mechanism for biasing the first and second levers against forward and reverse movement, the mechanism being free of operative connection of the pumps, and enabling relative adjustment of the resistance associated with each of the levers.

12. The vehicle as recited in claim 11, wherein:

the adjustment mechanism includes first and second biasing means associated with the first and second linkages.

13. The vehicle as recited in claim 12, wherein:

the first and second biasing means resist rearward movement of the levers.

14. The vehicle as recited in claim 13, wherein:

a third biasing means is provided for resisting forward movement of the first and second linkages and their respective connected levers at the same time.

* * * * *